June 9, 1964     A. C. LIND ETAL     3,136,724
PERIPHERAL-FEED CLARIFICATION TANK
Filed Nov. 14, 1960     3 Sheets-Sheet 1
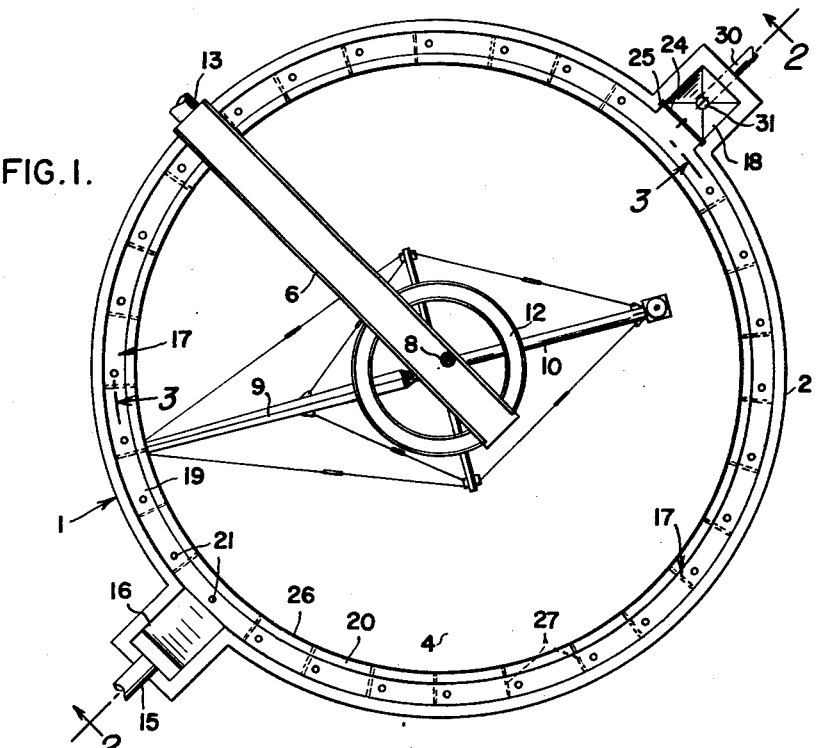
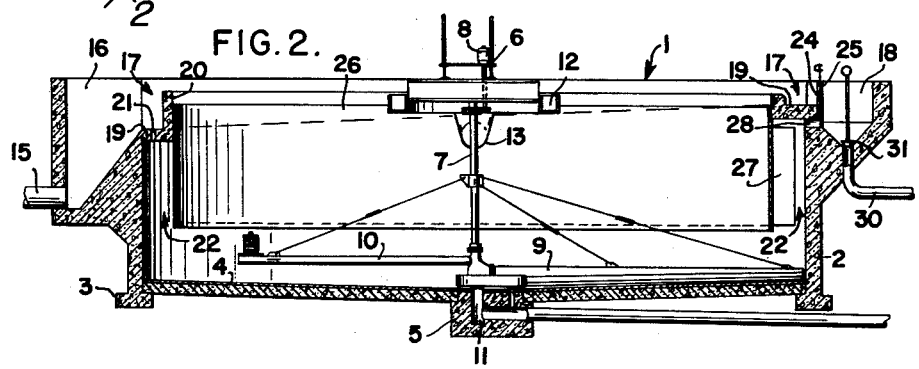
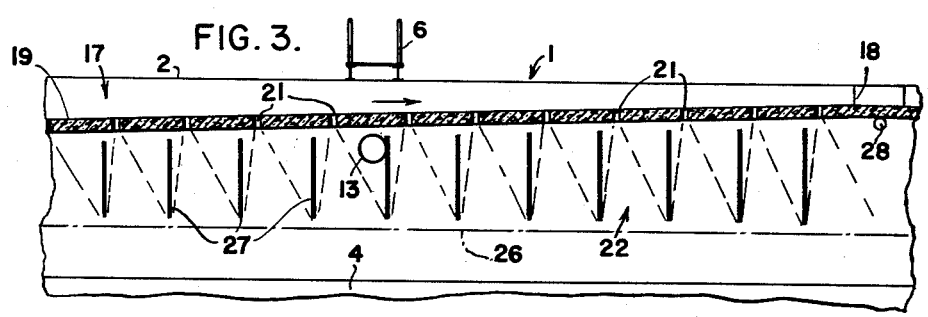

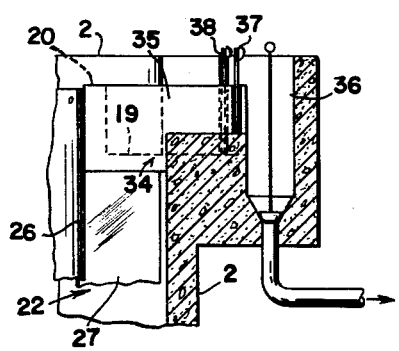
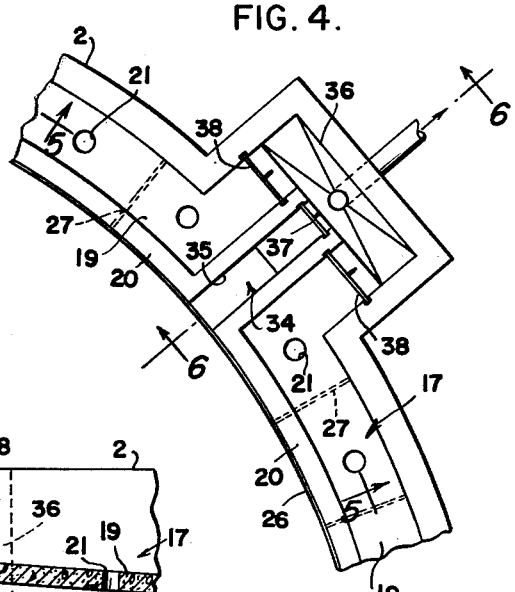
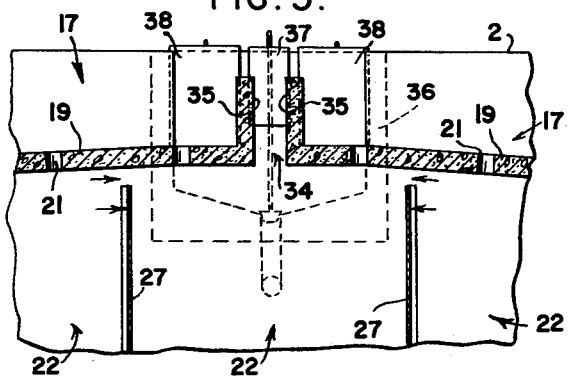
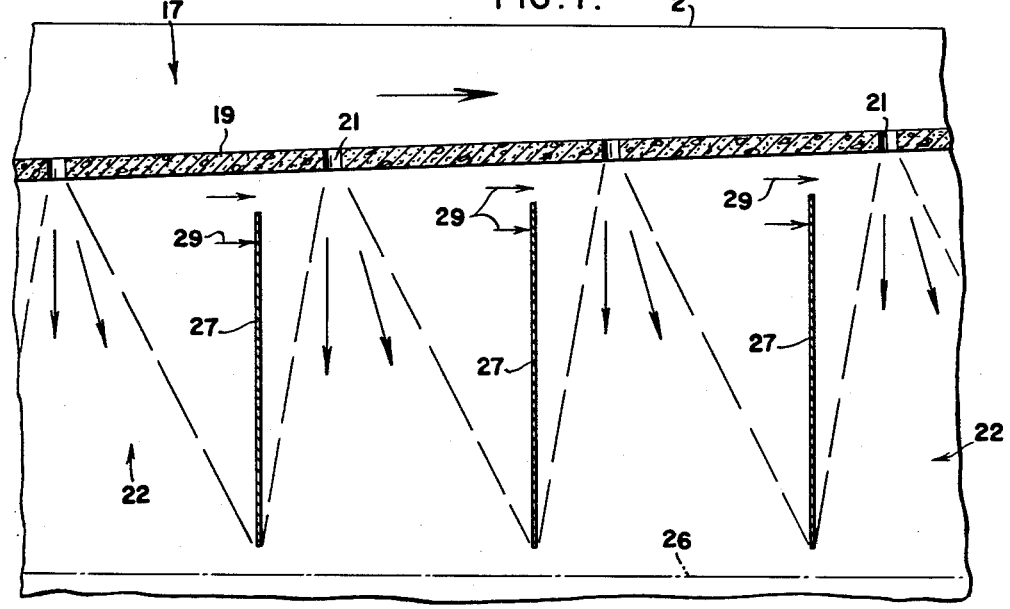

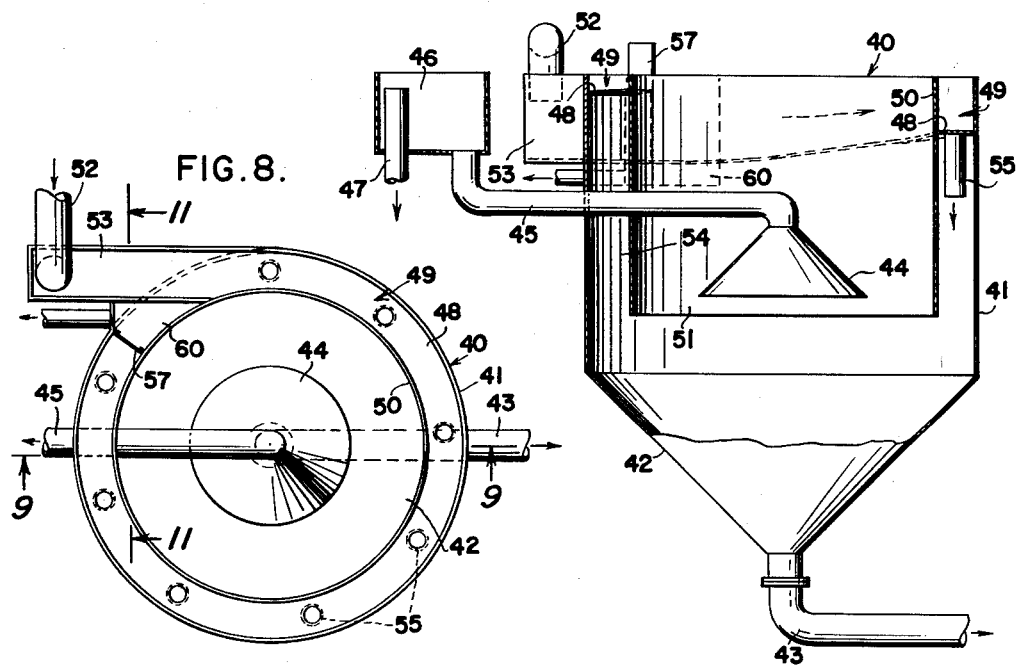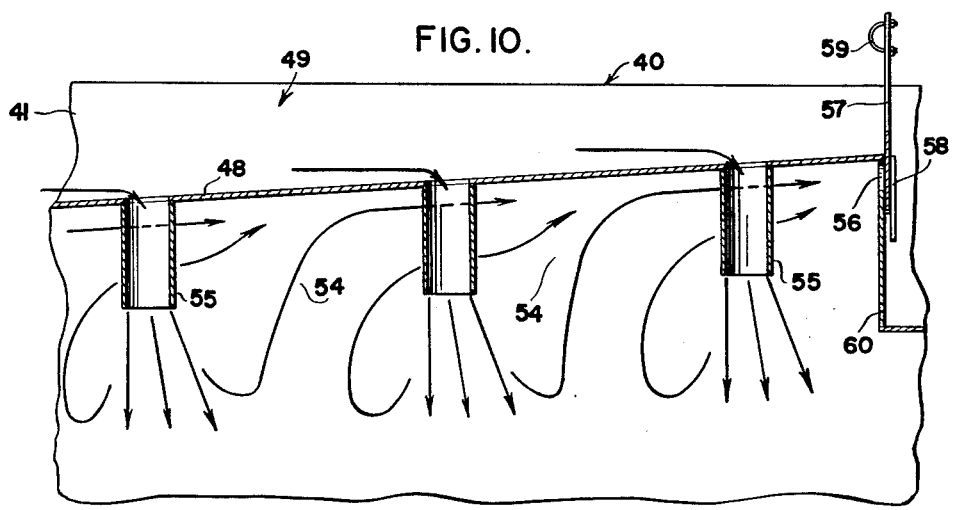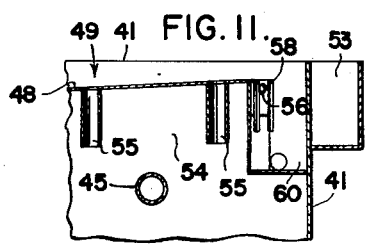

3,136,724
PERIPHERAL-FEED CLARIFICATION TANK
Arthur C. Lind, Wauwatosa, and William J. Katz, Fox Point, Wis., assignors to Chain Belt Company, Milwaukee, Wis., a corporation of Wisconsin
Filed Nov. 14, 1960, Ser. No. 68,962
3 Claims. (Cl. 210—519)

This invention relates to clarification and sedimentation tanks and particularly to means providing the improved distribution of influent for its introduction into the tank around the periphery thereof, and the separation and collection of the floatable substances from the influent in the course of such distribution. This application is a continuation in part of the application of the present inventors Serial No. 728,129 and filed April 14, 1958 for Apparatus for Separation of Liquids or of Solids from a Liquid, now Patent No. 2,961,099.

The distribution means comprises an open channel extending circumferentially of the tank and is provided with a floor sloping upwardly respecting the flow and having a series of ports opening downwardly into a lower annular distribution zone or zones. The annular distribution zone or zones extending around the tank are located between the wall of the tank and an annular skirt concentric therewith.

The influent is introduced into the open channel at the deeper end thereof and the floating material in the channel flow collects at the shallow end of the channel and is removed by suitable means or is allowed to drain into a sump. The floatable material carried with the flow through the ports separates from the borders of the submerged jets in the distribution zone or zones and rises to the floor of the channel and moves therebeneath toward the higher end of the floor where the material collects and is readily discharged from the tank.

The principal object of the invention is to utilize the influent and distribution channels of a peripheral-feed tank for the separation of scum and floatable material from the feed.

Another object of the invention is to provide efficient removal of floatable material in quantities which would not warrant a chain collector mechanism, for example, as where varying amounts of floatable material are received and the larger amounts usually separate out of the feed fairly readily.

Another object of the invention is to provide for the more efficient removal of grease and floatable solids from a clarification or sedimentation tank or any treatment tank.

Another object is to reduce the maintenance and attention required for a tank separating relatively large quantities of settleable and floatable solids.

Other objects and advantages of the invention will appear in the following description of the same as illustrated in the accompanying drawings.

In the drawings:

FIGURE 1 is a plan view of a primary or secondary sewage treatment tank of concrete construction;

FIG. 2 is a vertical cross-section of the tank shown in FIG. 1 and is taken on lines 2—2 of FIG. 1 and with the rotatable settled material removing means in another position;

FIG. 3 is a cross-sectional view taken on line 3—3 of FIG. 1 and shows the open and inverted channels and the series of distribution chambers between the skirt and wall of the tank and opening inwardly to the tank;

FIG. 4 is an enlarged plan view of alternate scum receiving means for the tank shown in FIGS. 1–3;

FIG. 5 is a section taken on line 5—5 of FIG. 4;

FIG. 6 is a section taken on line 6—6 of FIG. 4;

FIG. 7 is an enlarged view of some of the distribution zones shown in FIG. 3;

FIG. 8 is a plan view of a steel tank having a hopper bottom for collection of settleable solids and a submerged outlet;

FIG. 9 is a sectional view of the tank taken on line 9—9 of FIG. 8 and includes the overflow box which controls the liquid level maintained within the tank;

FIG. 10 is an enlarged sectional view taken on a line through the centers of the series of ports and looking toward the wall of the tank shown in FIGS. 8 and 9;

FIG. 11 is an enlarged cross-section taken on line 11—11 of FIG. 8 and shows the scum-receiving sump and guides for the control gate shown in FIG. 10; and FIG. 12 is an enlarged plan view of the sump shown in FIG. 8 and with the plate forming the control gate shown in section.

The tank 1 of concrete construction shown in FIGS. 1–3 of the drawings includes the circular wall 2 supported on the footing 3 and the tank bottom or floor 4 which slopes downwardly toward the central concrete base 5. The end of the bridge 6 at the center of the tank is supported on base 5 by a vertical central column, not shown, disposed within the drive tube 7 which is driven by the motor 8. Various means for removal of the settled solids from floor 4 may be provided, including for example, the eduction header 9 supported as shown with the counter-weight 10 by drive tube 7 and hydraulically connected with the discharge pipe 11 at the base 5.

The effluent trough 12 is supported from bridge 6 at the center of the tank and is connected to the discharge pipe 13 which extends beneath the bridge and through wall 2 of the tank.

The inlet pipe 15 opens into the box 16 at one side of tank 1 for delivery of the feed from box 16 to the ends of the channels 17 which extend around the rim of the tank to the scum box 18 located at the opposite side of the tank.

In the tank shown, the channels include floors 19 and the inner walls 20 of concrete construction integral with wall 2 of the tank. The floor 19 of each channel 17 slopes upwardly in the direction of flow from inlet box 16 and each floor is provided with a series of ports 21 through which the feed is discharged into the distribution zones 22. The top of wall 20 is set above the liquid level maintained in the tank by trough 12 so that all the feed to channel 17 is introduced into the tank through ports 21. By reason of the diminishing cross-section of channels 17, a given velocity is maintained in the channels so that the floatable material which separates out in the channel flow is carried or driven toward the shallow end of the channel where it collects until withdrawn. Various means for continuously or periodically drawing off the scum or floating material may be provided, including the gate 24 which fits the opening between the shallow ends of channels 17 and the box 18 as shown in FIG. 1. Gate 24 comprises a flat plate having opposite sides slideable in the grooves 25 formed in the concrete wall of the tank to support the gate and normally the gate is disposed in the grooves to close the draw-off opening referred to.

The zones 22, referred to, are located below channels 17 and between wall 2 of tank 1 and the steel annular skirt 26 which extends downwardly and may be supported from walls 20 of the channels. The lower edge of skirt 26 is spaced from floor 4 of the tank to provide for introduction of the feed from zones 22 into the main part of the tank for settling or clarification.

Zones 22 are defined by the vertical baffles 27 which extend from wall 2 of tank 1 to skirt 26. The lower ends of the baffles approach the lower edge of skirt 26 and the upper ends are located between adjacent ports 21 but are spaced from the floor 19 of the channel 17 above the baffles. The point where each port 21 opens into the corresponding zone 22 is determined by the angularity of the jets at maximum flow. This angularity is due to the velocity maintained in channels 17 to prevent solids from settling on the floors of the channel.

According to the present invention, the jets from the ports 21 of each channel have a generally downward direction, but the direction is at a slight angle respecting the vertical so that the flow in zones 22 beneath each channel has a slight horizontal movement around the tank in the direction of the channel flow and toward the higher end of the channel.

In the operation of tank 1, the low velocities in effect in zones 22 at the borders of the jets allows and promotes the separation of floatable material carried through ports 21. This material rises between the jets and collects beneath floors 19.

The slope of the floors upwardly in the direction of outlet 28 and the slight horizontal movement of the flow in zones 22, as described, which is also in the same direction, effect the movement of the separated material along the underside of the channel floors. The material passes between each jet and the wall 2 or skirt 26. In a tank of the type shown in FIGS. 1–3 the channels 17 are of generally the same width throughout and a space of six or more inches between each port and the wall 2 easily allows for the movement referred to.

The material passes from zone to zone over the baffles 27 which may be spaced only a few inches from floors 19 of the channels and is driven from zone to zone by the slight horizontal movement of the flow which exerts a force against each baffle as represented by the arrows 29 in FIG. 7. Baffles 27 which separate zones 22 also serve to restrict flow from ports 21 to a downwardly direction without interfering with the balance or equalization of the flow over the entire series of zones or around the periphery of the tank.

The scum or separated floatable material collects at outlet 28 which may be variously controlled or a separate outlet, not shown, may be provided. As shown in FIG. 2, outlet 28 is normally closed by plate 24 which extends downwardly over the outlet and is opened by lifting plate 24 for discharge into scum box 18.

The scum collected in box 18 is periodically withdrawn through the drain pipe 30 which may be controlled by a valve or telescopic draw-off means, not shown, or by the removable plug 31 which closes the open end of the pipe in the floor of box 18. The embodiment of FIGS. 1–3 is preferred where the scum collects slowly and requires only occasional removal by removing plate 24 for a few moments. The removal of plate 24 allows the scum separately collected at the shallow ends of channels 17 and beneath floors 19 to flow into box 18 and when most of the scum has been removed plate 24 should be replaced.

For collection of larger amounts of floatable material from zones 22, the tank 1 may be provided with the open well 34 between the ends of channels 17 as shown in FIGS. 4–6. Three sides of the well are of concrete construction and include a part of wall 20 of each channel and the side walls 35 extending to the sump or scum box 36. The gate side walls 35 extending to the sump or scum box 36. The gate 37 is supported between side walls 35 so as to be removable and to allow the collected scum to flow into box 36. The plates 38 which are similar to plate 24 separately provide for the removal of the respective channels 17 as described.

In smaller tanks such as for industrial waste treatment or other processes, the tank may be of steel construction such as the tank 40 shown in FIGS. 8–12 of the drawings.

Tank 40 includes the side wall 41 and conical bottom 42 centrally connected to the pipe 43 for removal of the settled solids therefrom. The clarified liquid is removed from the center of the tank through the hood 44 and pipe 45 which opens into the separate box 46 shown in FIG. 9 only. The discharge pipe 47 from box 46 has its inlet end disposed within the box to maintain a given liquid level within tank 40 which is above the entire length of the floor 48 of the channel 49 extending around the rim of the tank. Floor 48 extends from wall 41 to the concentric inner cylindrical member which it supports and which forms the inner wall 50 of channel 49 and the lower annular skirt 51.

The delivery pipe 52 discharges into the steel inlet box 53 which is attached to the tank and opens into the deeper end of channel 49 for introduction of the feed thereto. The flow enters the annular distribution zone 54 between skirt 49 and wall 41 through the series of pipes 55 extending downwardly from floor 48 and in registry with corresponding ports formed in floor 48.

Pipes 55 are of a length, number and size necessary for the introduction of the flow into zone 54 with the desired amount of horizontal movement and to provide whatever circular motion in tank 40 may be desired, if any.

As in the embodiment of the invention of FIGS. 1–7, the floating material at the surface of the channel flow is driven toward the end of the channel where it collects and the floatable material which is carried through pipes 55 and separates from the jets, rises to the underside of channel floor 48 and moves toward the higher end of the floor.

As shown in FIG. 10, the separated material passes between the pipes 55 and skirt 51 or wall 41 of tank 40 to the outlet 56 which is normally closed by the plate 57. Plate 57 is vertically movable in the guides 58 and forms the end wall of channel 49 so that when lowered by the handle 59 and the upper edge of the plate is below the liquid level at the end of the channel, the scum flows over the plate into the scum box 60 located adjacent to inlet box 46. By raising plate 57, outlet 56 is uncovered and the material collected beneath channel floor 48 flows through the outlet into the box 60. The material is driven through outlet 56 by the head or the liquid level maintained in tank 40 by pipe 47. Means not shown, other than plate 57 may be provided to control the withdrawal of the collected scum and floatable material.

The present invention provides an improved and more useful separation tank and not only eliminates the problem of scum removal from the feed, but promotes the separation of the scum from the feed for a better or clearer tank effluent.

The peripheral feed tank provides increased capacity. In tanks having a high channel velocity and large distribution zone beneath the channel, the scum separation and collection beneath the channel may be the principal means for scum removal.

Various embodiments of the invention may be employed within the scope of the following claims particularly pointing out and distinctly claiming the subject matter which is regarded as the invention.

We claim:

1. In a tank for the separation of floatable and settleable material including means for the withdrawal of clarified liquid from the tank and maintaining a given liquid level within the tank and other means for withdrawal of the settled material therefrom, said tank having an outer wall and an open feed channel extending around the periphery of the tank, said channel having an inlet end and a scum outlet at the opposite end thereof and including a floor sloping upwardly from the inlet end, a skirt extending downwardly from said channel and baffles extending from the tank wall to said skirt defining distribution zones extending in a series around the periphery of the tank and opening at their lower ends into the lower part of the tank, said floor of the channel having a series of ports with each port opening into the upper end of a corresponding zone for the introduction of the feed into the zone in the form of a jet, means beneath said channel at the higher end of the floor thereof for the continuous collection of floatable material separated from the jets in said zones and moving upwardly along the underside of said floor to said means, said baffles being spaced from said channel floor for communication between zones at the upper ends thereof for movement of the floatable material to said continuous collection means, and said tank having an outlet from said collection means and means normally closing said outlet except for the periodic discharge of the collected material.

2. In a tank for the gravity separation of suspended material including means for the withdrawal of clarified liquid from the tank and maintaining a given liquid level within the tank, said tank having an outer wall and an open feed channel extending around the periphery of the tank, said channel having an inlet end and including a floor sloping upwardly from the inlet end, a skirt extending downwardly from said channel and baffles extending from the tank wall to said skirt defining distribution zones extending in a series around the periphery of the tank and opening at their lower ends into the lower part of the tank, said floor of the channel having a series of ports with each port opening into the upper end of a corresponding zone for the introduction of the feed into the zone in the form of a jet, collection means at the higher end of the floor of the channel for the continuous receiving of floatable material separated from the jets in said zones and moving upwardly along the underside of said floor to said means, said baffles being spaced from said channel floor for communication between zones at the upper ends thereof for movement of the floatable material to said continuous collection means, and means for removal of the floatable material from said collection means.

3. In a tank for the gravity separation of suspended material including a side wall and a floor and means for the withdrawal of clarified liquid from the tank and for maintaining a given liquid level therein, an open feed channel extending around the periphery of the tank at said liquid level and having an inlet end and a scum outlet at the opposite end thereof, said channel having a submerged floor sloping upwardly from the inlet to the scum outlet end thereof to provide the channel with a diminishing cross-section and said channel floor having a series of ports opening downwardly, a skirt extending downwardly from said channel and spaced from the wall and floor of the tank, said skirt and tank wall with the channel floor defining an inverted sloping channel beneath and substantially the length of the channel floor and a feed distribution zone beneath said inverted channel, vertical baffles between adjacent ports and extending from said skirt to said tank wall, said vertical baffles extending downwardly from an imaginary line spaced below said channel floor and defining the lower limits of said inverted channel and upper limits of said feed distribution zone, and a second, submerged scum outlet extending through the tank wall from the higher end of said inverted channel.

References Cited in the file of this patent
UNITED STATES PATENTS

| | | |
|---|---|---|
| 2,103,828 | Seip | Dec. 28, 1937 |
| 2,340,226 | Roberts et al. | Jan. 25, 1944 |
| 2,418,950 | Montgomery | Apr. 15, 1947 |
| 2,881,922 | Kelly | Apr. 14, 1959 |
| 2,959,290 | Montgomery | Nov. 8, 1960 |
| 2,961,099 | Lind et al. | Nov. 22, 1960 |
| 3,017,998 | Conley | Jan. 23, 1962 |